United States Patent [19]

Bynum

[11] 3,857,612
[45] Dec. 31, 1974

[54] DIFFERENTIATOR AND VARIABLE THRESHOLD GATE CIRCUIT FOR USE IN A VEHICLE SKID CONTROL BRAKING SYSTEM

[75] Inventor: Byron G. Bynum, Dallas, Tex.
[73] Assignee: Texas Instruments Incorporated, Dallas, Tex.
[22] Filed: Sept. 5, 1972
[21] Appl. No.: 286,386

[52] U.S. Cl............................. 303/21 BE, 303/20
[51] Int. Cl............................................. B60t 8/12
[58] Field of Search ............ 188/181 A; 303/20, 21; 324/162; 340/52 R, 53, 262

[56] References Cited
UNITED STATES PATENTS
3,554,612   1/1971   Harned ........................ 303/21 BE
3,578,819   5/1971   Atkins ........................... 303/21 P
3,717,384   2/1973   Harned .......................... 303/21 P X Primary Examiner—Trygve M. Blix
Assistant Examiner—Stephen G. Kunin
Attorney, Agent, or Firm—Harold Levine; James T. Comfort; William E. Hiller

[57] ABSTRACT

Disclosed is a differentiator and variable threshold gate circuit utilized in a vehicle skid control breaking system. The differentiator circuit is responsive to a first signal representing actual vehicle wheel speed and to a feedback signal provided by integrating the differential of the first signal to thereby approximate the first signal. The differentiator circuit provides first and second output signals respectively representing vehicle wheel acceleration and deceleration rates which actuate the variable threshold gate circuit. The variable threshold gate circuit comprises a voltage comparator which, in conjunction with a variable reference generator, provides first and second gated output signals respectively indicative of vehicle wheel acceleration and deceleration rates above a variable threshold level. The variable threshold level is provided by a comparison of the first and second output signals with a reference signal generated by the reference generator. The first and second gated output signals are generated at a lower acceleration/deceleration rate than at which they are inactivated. A hysteresis circuit responsive to the first and second gated output signals selectively biases the variable reference generator to thereby provide a lower threshold level and a more positive switching action.

8 Claims, 5 Drawing Figures

DIFFERENTIATOR AND VARIABLE THRESHOLD GATE CIRCUIT FOR USE IN A VEHICLE SKID CONTROL BRAKING SYSTEM

BACKGROUND INFORMATION

This invention relates to a vehicle skid control system wherein the vehicle brakes are subjected to a "pumping-type" or "pulse action" mode of operation by the system under certain operating conditions. More particularly, this invention concerns a sub-system of such a vehicle skid control system for generating analog signals representative of wheel acceleration and deceleration and gating signals representing rates of wheel acceleration and deceleration above selected threshold values which are variable with wheel conditions.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel acceleration, deceleration and speed and vehicle land speed. It has been readily accepted by safety experts and professional land vehicle drivers that vehicle stability can be achieved by automatically "pumping" or "pulsing" of the brakes associated with the wheels of the land vehicle in a pre-programmed manner dynamically related to the rate of acceleration and deceleration of the land vehicle.

In more recent times, several systems have been developed that operate on the principle of selectively ihibiting the normal braking action initiated by the operator of the land vehicle. In one of these systems, wheel speed sensors are utilized to generate A.C. signals that are proportional to vehicle wheel speed. The vehicle wheel speed signals are then processed through a control module which generates a D.C. voltage to energize a solenoid in an actuator that controls the hydraulic braking system to the vehicle wheels. When a skid is imminent, a command signal from the control module causes the actuator solenoid to close a vacuum passage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. Upon selected vehicle wheel conditions, the control module produces a signal to de-energize the actuator solenoid. This in turn restores line pressure in the vehicle braking system and reapplies the vehicle brakes. In effect, what is achieved by this system is that the vehicle brakes are "pumped" or "pulsed" in a manner often recommended for controlled braking under adverse driving conditions.

The control module of the aforementioned system includes a speed sensor and a frequency converter. The speed sensor is coupled to either the wheels or to the drive shaft of a land vehicle, e.g., electromagnetically, optically or mechanically, and generates a varying A.C. signal (A) which has frequency variations proportional to wheel speed. That is to say, the faster the wheel speed, the higher the frequency of the signal A connected to the frequency converter. The variable A.C. signals A generated by the speed sensor are coupled to the frequency converter wherein they are converted to a varying D.C. signal (B) having a D.C. magnitude proportional to vehicle wheel speed. The varying D.C. signal B generated by the frequency converter is coupled to both a slip and ramp signal generator and comparator and a D.C. level detector and zero velocity gate circuit.

The slip and ramp signal generator and comparator modifies or offsets the varying D.C. signal B a preselected value and produces a "slip" signal ($C_1$), and then under the control of the slip signal $C_1$, it develops a ramp signal (c) having a dynamically programmable constant current rate of discharge. The ramp signal C is then compared with the varying D.C. signal B, and when the wheel speed of the land vehicle drops below the related vehicle land speed, represented by signal B dropping below the ramp signal C, a "slip" gate signal (D) is generated. The slip gate signal D is then coupled to one of the inputs of a brake control logic circuit.

The D.C. level detector and zero velocity gate circuit in response to the variable D.C. signal B generated by the frequency converter, generates two output signals (G and H), each signal being clamped at a selected D.C. level of the input signal applied thereto, with such signals being respectively coupled to the deceleration differentiator circuit and to the deceleration differentiator circuit. Basically, the reason for detecting the preselected D.C. levels of the input signal B and developing output signals G and H, is to prevent any ripple characteristics of the signal applied thereto, which frequently occurs when the land vehicle is operated at low speed, from being coupled into the deceleration and acceleration differentiator circuits. The D.C. level detector and zero velocity gate circuit develops a zero velocity gate signal (I) and couples this signal I to one input of the brake control logic circuit.

The deceleration differentiator differentiates the variable D.C. signal G applied thereto and generates a pulse output signal (O) which signal O is coupled to the variable threshold deceleration gate circuit; while the acceleration differentiator differentiates the variable D.C. signal H applied thereto and generates pulse output signals (P and J) which signal P is coupled to the variable threshold acceleration gate circuit and which signal J is coupled to an acceleration programmed oscillator circuit.

The variable threshold deceleration gate circuit has a variable threshold feature which produces an output gate signal (K) having a "turn on" threshold at a different level than its "turn off" threshold. That is to say, the variable threshold deceleration gate circuit "turns on" at a lower threshold than it "turns off" so as to provide a desirable fast "turn off" of the vehicle braking application relative to the rate of deceleration of the wheels of the land vehicle. The pulse output signal K developed by the variable threshold deceleration gate circuit is present when the deceleration rate of change of the vehicle wheels exceeds a preset value and is coupled to one of the inputs of the brake control logic circuit and to the acceleration programmed oscillator circuit.

The variable threshold acceleration gate circuit is similar to the variable threshold deceleration gate circuit but for the fact that it is responsive to the pulse output signal P developed by the acceleration differentiator, and generates a pulse output signal (Q) indicative of acceleration of the vehicle wheel speed above a preselected valve The circuit also has a variable threshold feature in which the "turn on" of the circuit is at a lower threshold than the "turn off" feature of the circuit. The pulse output signal Q of the variable threshold acceleration gate circuit is coupled to one of the inputs of the brake control logic, the acceleration differentiator circuit and a reset timer and gate circuit.

The acceleration programmed oscillator circuit receives the analog signal (J) from the acceleration differentiator which programs the oscillator so as to produce a sawtooth pulse output signal (L) that has a frequency proportional to the rate of acceleration of the vehicle wheels. This output sawtooth signal L is coupled to a fixed threshold variable duty cycle pulse generator.

The fixed threshold variable duty cycle pulse generator is programmable from zero percent to 100 percent duty cycle with respect to the output signal developed thereby M. The output signal M of the fixed threshold variable duty cycle pulse generator is coupled to one of the inputs of the brake control logic circuit.

The reset timer and gate circuit is reset by one of the outputs of the brake control logic circuit (T) and commences a reset timing cycle at the end of the reset time period which develops a reset gate signal (V) for controlling the application of the output pulse signal Q generated by the variable threshold acceleration gate circuit and selectively couples this output pulse signal Q to one of the inputs of the brake control logic circuit. The brake control logic circuit in response to the input logic and analog signals coupled thereto provides selective actuation via signal E to the output driver circuit. The driver circuit is coupled to a vehicle brake controller valve for selective interruption of the braking application to thereby provide a "dumping" actuation.

A detailed description of the above described skid control system having differentiator and variable threshold gate circuits over which circuits this invention is an improvement is set forth in copending patent application, Ser. No. 266,798, filed June 27, 1972.

Other known and similar systems that operate on the principle of inhibiting the normal braking action initiated by the operator of the land vehicle is set forth in U.S. Pat. No. 3,578,819, issued May 18, 1971, for SKID CONTROL SYSTEM, in the name of Thomas M. Atkins and in copending patent application Ser. No. 25,131, filed Apr. 2, 1970, for VEHICLE SKID CONTROL SYSTEM, which is assigned to the assignee of this application.

OBJECTIVES OF THE INVENTION

It is an object of the present invention to provide a differentiator and variable threshold gate circuit in a vehicle skid control braking system, responsive to a signal representing wheel speed of the vehicle for selectively generating analog output signals indicative of vehicle wheel acceleration and deceleration conditions.

It is another object of the present invention to provide in a vehicle skid control braking system of the type that selectively controls engagement and disengagement of the braking system of a vehicle in accordance with selected braking conditions, a differentiator and variable threshold gate circuit for providing signals indicative of rates of wheel deceleration and acceleration above first and second variable threshold levels, respectively, from one input signal representing actual wheel velocity.

It is still another object of the present invention to provide a differentiator circuit for providing the mathematical derivative of an input signal comprising a differential amplifier responsive to the input signal and to a feedback signal generated by integrating the differential between the first input signal and the feedback signal as provided utilizing current generators.

It is yet another object of the present invention to provide a variable threshold gate circuit for generating first and second output signals when an input signal exceeds a single variable threshold level responsive to the input signal which threshold varies after the input signal exceeds the initial threshold level.

SUMMARY OF THE INVENTION

An improved vehicle skid control system in which this invention is advantageously utilized includes a wheel sensor, which may be coupled to the wheels or to the drive shaft of the land vehicle and generates A.C. signals having a frequency varying in accordance with vehicle wheel speed A. These frequency varying signals A are coupled to a frequency converter that produces a D.C. output signal having a voltage magnitude that varies proportionally with the frequency of the A.C. signals generated by the speed sensor B. The varying D.C. wheel speed signals B generated by the frequency converter are coupled through a D.C. level detecting and gate circuit to the differentiator and variable threshold gate circuit.

The differentiator and variable threshold gate circuit is responsive to a first input signal selectively representative of vehicle wheel speed and to a feedback input signal generated by integrating a signal responsive to the differential of the first input signal and the feedback input signal. An acceleration generator and a deceleration generator are selectively actuated by the differential signal to supply that amount of current to the integrator circuit means which is necessary to maintain the feedback input signal substantially equal to the first input signal. The current supplied by the generators is respectively representative of vehicle wheel acceleration and deceleration rates.

The signals representing acceleration and deceleration rates actuate a dual voltage comparator circuit and a variable reference generator. The variable reference generator provides a reference threshold voltage signal selectively proportional to the acceleration and deceleration rate signals such that signal comparison by the dual voltage comparator provides output signals whenever the acceleration and deceleration signals exceed the reference signal. The reference signal is provided such that the acceleration and deceleration signals initially exceed the reference signal at a voltage level different from the level wherein they no longer exceed the reference signal, thereby providing the variable threshold.

A more complete understanding of this invention and its advantages will be apparent from the specification and claims and from the accompanying drawings illustrative of the invention.

DETAILED DESCRIPTION — FIG. 1

Figure 1:
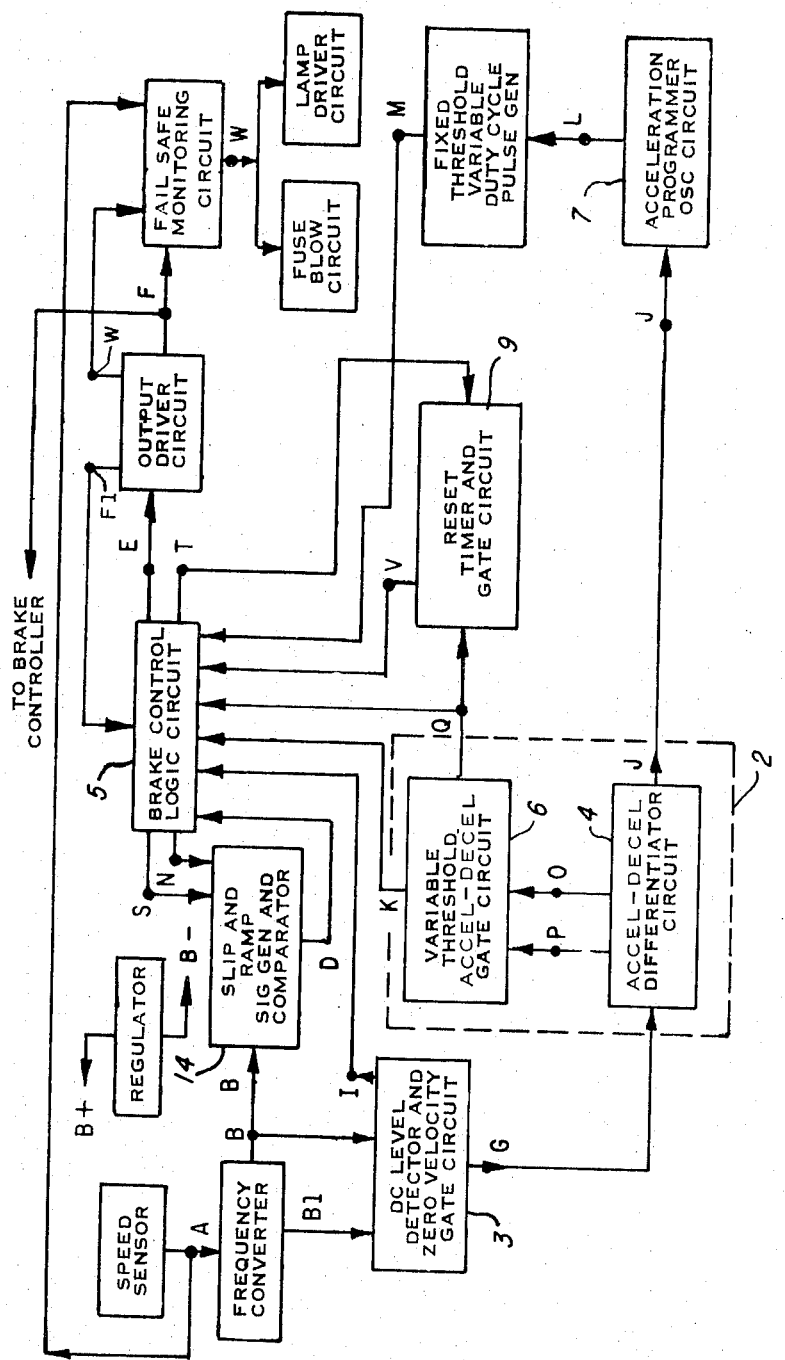
FIG. 1 is a block diagram of one embodiment of the skid control braking system in which one embodiment of this invention is advantageously utilized.

Referring now to FIG. 1, there is illustrated in block diagram format the functional components of another vehicle skid control module, similar to the above described systems, in which this invention is advantageously utilized. The differentiator circuit and variable threshold gate circuit of this invention are shown in FIG. 1 as sub-system 2. The coupling circuitry external to the differentiator and variable threshold gate subsystem 2 is exemplified and functionally described in the aforementioned copending patent application, Ser. No. 266,798, filed June 27, 1972.

The differentiator circuit and variable threshold gate circuit subsystem 2 of this invention comprises an acceleration-deceleration differentiator circuit for receiving a signal representative of vehicle wheel speed and generating therefrom first and second signals representative of vehicle wheel acceleration and a third signal representative of vehicle wheel deceleration. A variable threshold gate circuit 6 is coupled to the differentiator circuit 4 and generates first and second gating signals respectively indicative of vehicle wheel acceleration and deceleration rates exceeding a selective threshold level representative of less than optimum braking actuation or of an imminent skid respectively.

The acceleration-deceleration differentiator circuit 4 preferably receives a wheel speed signal representative of vehicle wheel velocity such as signal G from a D.C. level detector and zero velocity gate circuit 3. In response to wheel speed signal G, analog acceleration signals P and J and analog deceleration signal O are generated. Signal J is typically a current controlled signal and is coupled to an acceleration programmed oscillator circuit 7 for programming circuit 7 in proportion to wheel acceleration.

Analog acceleration signal P is generated when speed signal G exhibits a positive rate of magnitude change, and deceleration signal O is generated when speed signal G exhibits a negative rate of magnitude change. In response to signals P and O the variable threshold gate circuit 6 generates gate signal Q when analog acceleration signal P exceeds a variable voltage threshold level, and gate signal K is generated when analog deceleration signal O exceeds the variable threshold voltage level. It is understood that the term "exceeds" encompasses both conditions wherein negative going pulses from a relatively high magnitude and positive going pulses from a relatively low magnitude "exceed" the threshold. Signals Q and K are generated when signals P and O respectively initially exceed a first threshold level and are inactivated when signals P and O respectively drop below a second threshold voltage level, which second level exceeds in magnitude the first threshold level. Accordingly, gate circuit 6 "turns on" at a lower threshold than it turns off, so as to provide a desirable fast actuation of the skid control system relative to the rate of change of the wheels of the land vehicle.

Accel gate signal Q is preferably coupled to a brake control logic circuit 15 and to a reset timer and gate circuit 9 to provide actuation thereof. Decel gate circuit K is preferably coupled to the brake control logic circuit 15 to provide actuation thereof.

DETAILED DESCRIPTION — FIG. 2

Figure 2:
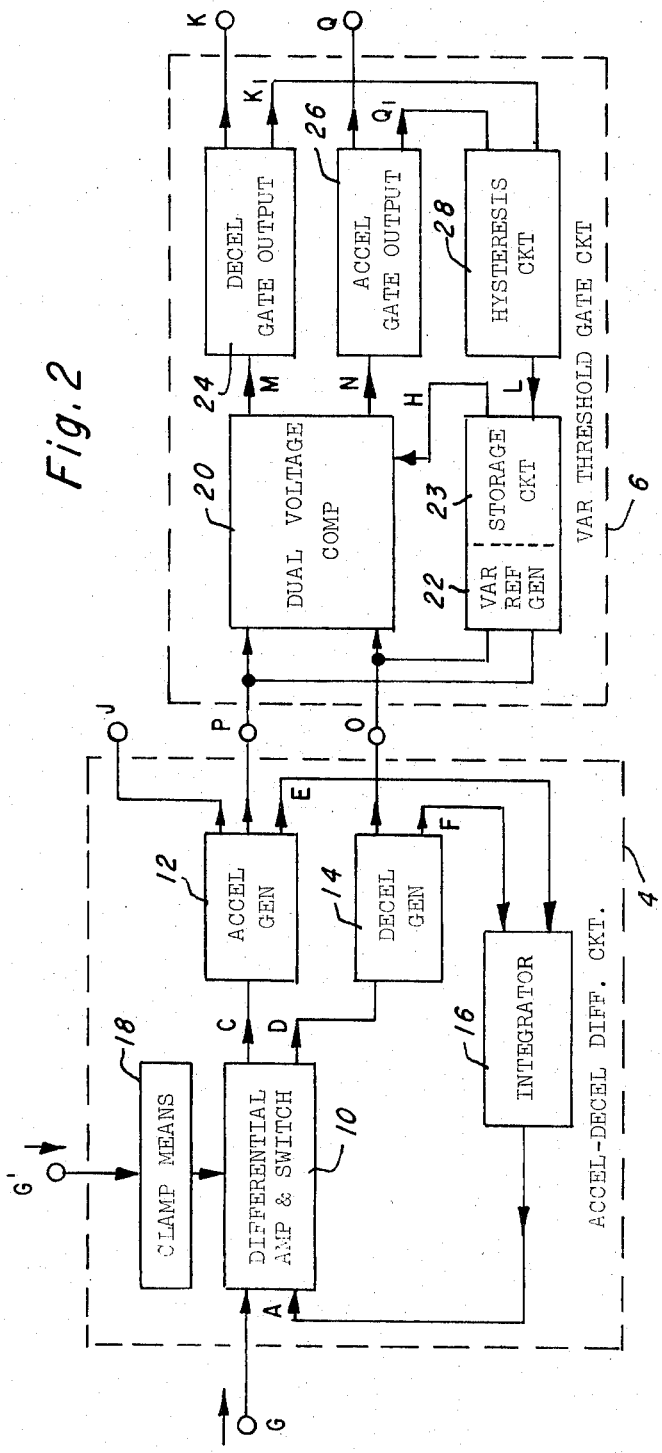
FIG. 2 shows the functional components of the differentiator circuit and variable threshold gate circuit of FIG. 1.

In FIG. 2 is depicted the differentiator circuit and variable threshold gate circuit of this invention. As noted above, the circuit function embodied in FIG. 2 is particularly advantageous when utilized in the vehicle skid control braking system of FIG. 1. Another differentiator circuit suitable for providing signals representative of acceleration and deceleration conditions in a vehicle skid control braking system is described in detail in copending patent application, Ser. No. 268,401, filed July 3, 1972.

The acceleration-deceleration differentiator circuit 4 comprises a differential amplifier and switch 10 for receiving the input signal which is to be mathematically differentiated. In the vehicle skid control braking system of FIG. 1, signal G is one such input signal selectively representative of vehicle wheel speed. Signal G typically exhibits a clamped region of fixed magnitude when the wheel speed of the vehicle drops below a preselected threshold level. Clamping the input signal to a minimum magnitude during low vehicle wheel speed operation has shown to be advantageous in vehicle skid control application.

During low speed operation electrical noise tends to disrupt circuit operation, and the clamped region prevents noise interruption of the operation. The differentiator circuit 4 also provides clamp means 18 for clamping an unclamped input signal, such as signal G1. A signal B directly proportional to wheel speed may be utilized as the input in conjunction with bias signal G' utilized to establish the minimum signal level below which input signal B is decoupled from the differential amplifier 10, or below which level the differential amplifier 10 is inactivated. The differential amplifier and switch circuit 10 provides output signals C and D respectively responsive to positive and negative rate of amplitude change conditions of the input signal to differential amplifier 10. The acceleration generator circuit 12 is responsive to signal C representative of a positive amplitude rate of change and generates acceleration analog signals J and P proportional to acceleration conditions of the vehicle's wheels.

Analogously, deceleration generator circuit 14 is responsive to signal D representative of a negative amplitude rate of change and provides deceleration differential signal O proportional to deceleration conditions of the vehicle's wheels.

The differentiator circuit 4 further comprises an integrator circuit 16 which is coupled to the acceleration and deceleration generator circuits 12 and 14 respectively. Signals E and F which are respectively representative of acceleration and deceleration are integrated to provide the voltage signal A which is the feedback input signal to the differential amplifier circuit 10. The feedback loop comprising the integrator 16 and the accel and decel generators 12 and 14 tend to provide voltage A having the same magnitude as input B which is representative of actual vehicle wheel velocity. The current generators 12 and 14 supply the necessary current to the integrator 16 which is required to allow the voltage A to follow the waveform of input B. The "necessary current" supplied to the integrator is actually that amount equal to the desired mathematical derivative of the input signal B.

The variable threshold gate circuit 6 comprises a dual voltage comparator 20 and a variable reference generator 22. The comparator 20 monitors acceleration and deceleration differentiator signals P and O and generates output signals indicative of rates of acceleration and rates of deceleration respectively exceeding a selected threshold voltage level. The variable reference generator 22 is responsive to differentiator signals O and P to provide signal H which is utilized as a variable reference level. Generator 22 features a storage circuit 23 which generates threshold signal H to provide a variable threshold to the comparator 20 in response to the dynamic acceleration or deceleration input signals. The gated output signals are respectively generated upon the condition that either differentiator signal O or P exceeds in magnitude the threshold signal H and exceeds the stored value of threshold signal H in the storage circuit 23. Upon a magnitude decrease of the magnitude signals, the magnitude of the stored signal is that magntiude immediately preceding the voltage decrease. In general, the variable threshold is equal to the peak input signal minus any offset voltage. The storage of signal H and its proportionality to the differentiator signals provide the variable threshold featured in this invention and permit a fast gating response to changing acceleration and deceleration conditions.

The variable threshold gate further comprises deceleration and acceleration output circuits 24 and 26 respectively, which provides signals K and Q indicative of rates of deceleration and acceleration exceeding the variable threshold level established by signal H.

The variable threshold gate circuit 6 further comprises a hysteresis circuit 28 coupling the deceleration gate and acceleration gate circuits 24 and 26 to the variable reference generator 22. The hysteresis circuit 28 selectively biases the variable reference generator 22 to provide signal H having an altered magnitude which selectively lowers the threshold voltage level of comparator circuit 20 (provides hysteresis) and provides a more positive switching action when either differentiator input exceeds the initial threshold voltage H.

Figure 3A:
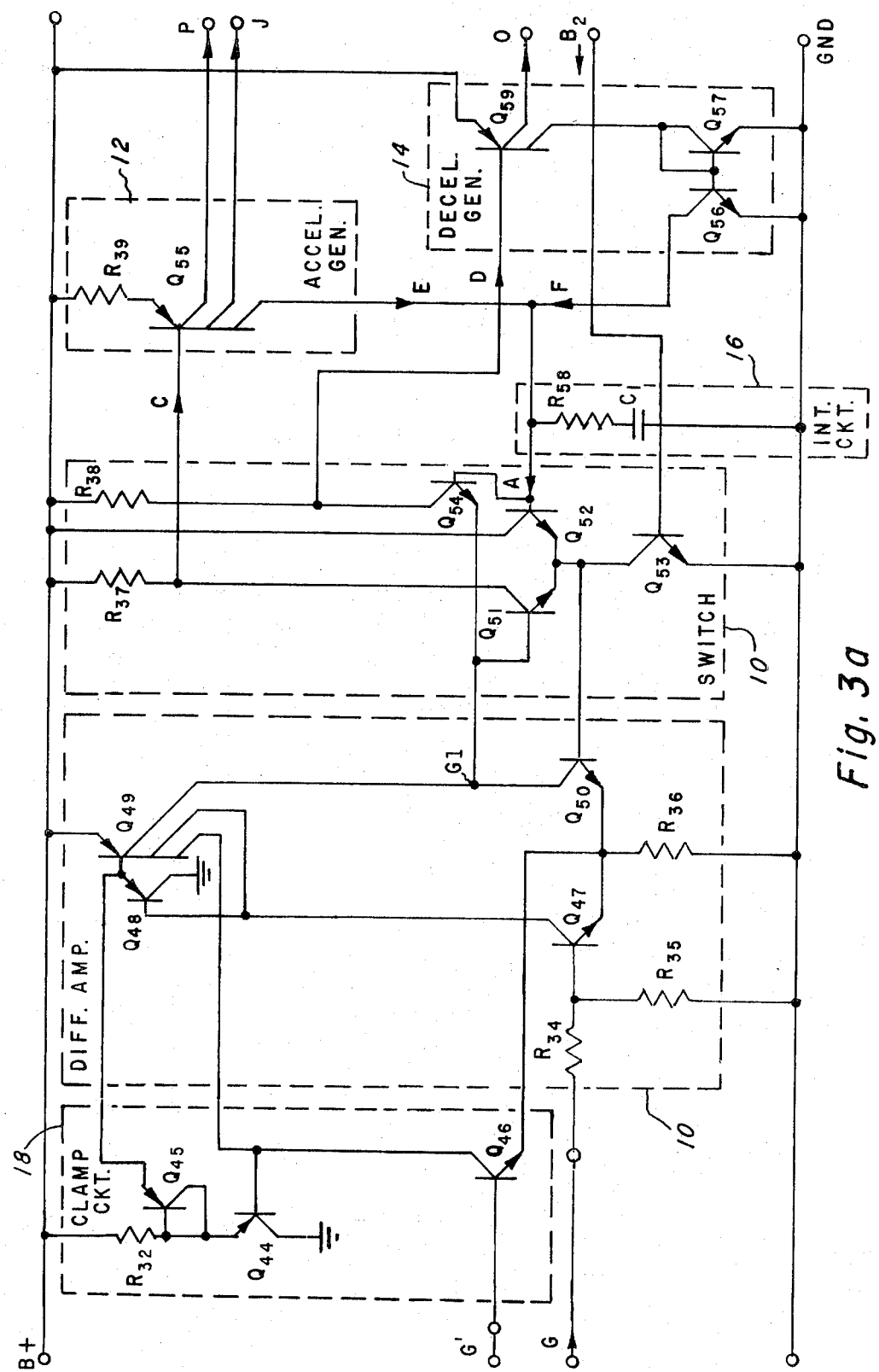
FIGS. 3a and 3b depict circuit schematics of one embodiment of the differentiator circuit and variable threshold gate circuit of this invention shown in FIG. 2.
Figure 3B:
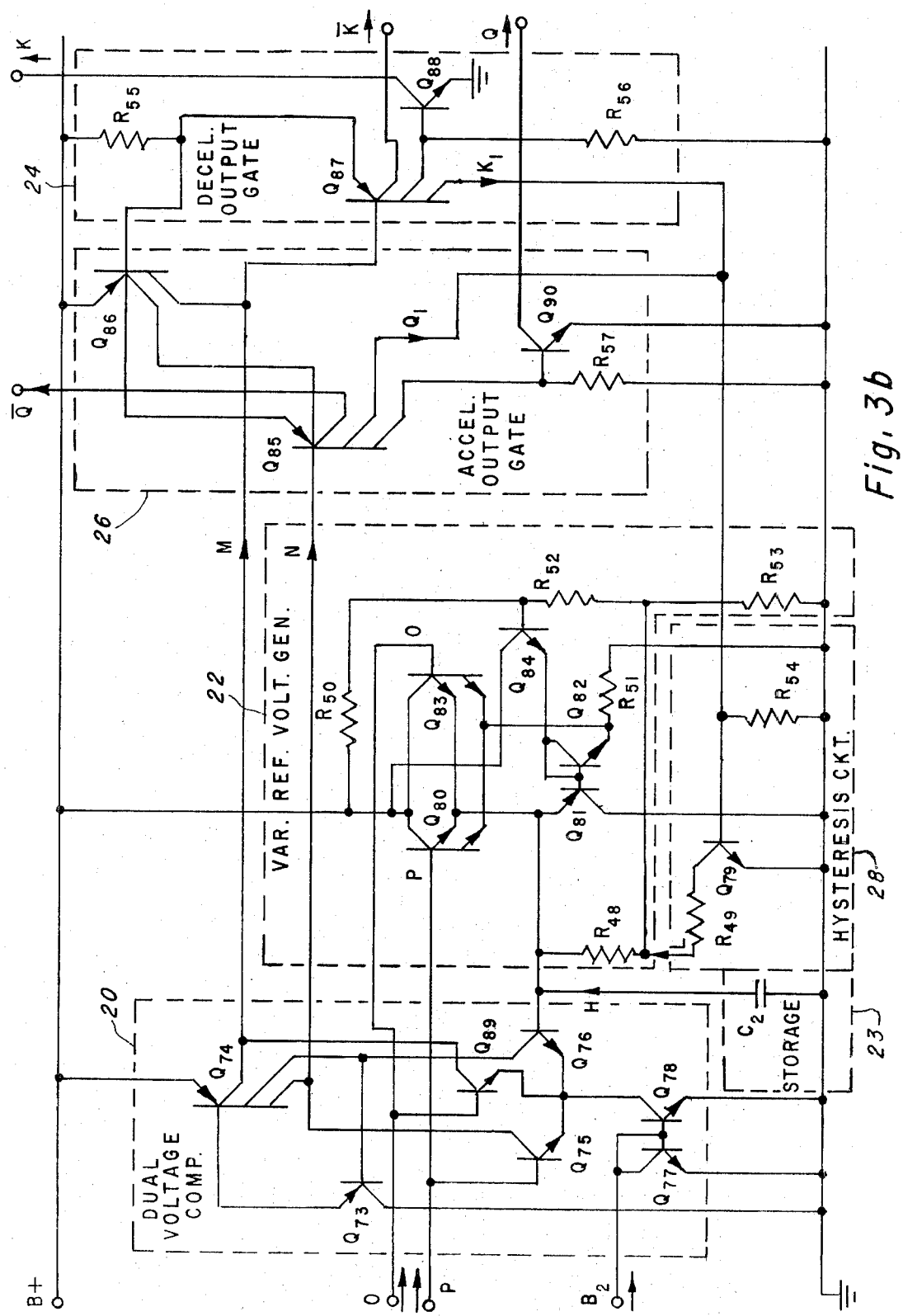

DETAILED DESCRIPTION — FIGS. 3a–3b

Shown in FIGS. 3a–3b is a specific circuit embodiment of the functional block system described in FIG. 2.

The differential amplifier and switch 10 comprises differential transistor pair Q47 and Q50 having commonly connected emitters resistively coupled to circuit ground. The base of differential transistor Q47 is coupled to the input signal G via resistor divider network R34 and R35 and to circuit ground. The collectors of differential transistors Q47 and Q50 are coupled to active load transistors Q48 and Q49, which force equal currents in the collectors of the differential transistor pair for biasing and high gain. Switch 10 of the differential amplifier and switch 10 comprises a pair of switching transistors Q51 and Q54 and emitter follower transistor Q52. Q51 and Q52 have commonly connected emitters coupled to the base of differential transistor Q50 and further coupled to circuit ground through the collector-emitter circuit of bias transistor Q53. Bias transistor Q53 is actuated by constant D.C. bias signal $B_2$ on the base terminal thereof. The collector of emitter-follower transistor Q52 is coupled directly to the voltage supply B+ while the collector of transistor Q51 is coupled thereto via resistor R37 and provides the input to acceleration current generator 12.

The base of Q51 is coupled to the collector of differential transistor Q50 which functions as the differential amplifier to the switch 10. Switching transistor Q54 has a base commonly connected to the base of emitter-follower transistor Q52 and has an emitter commonly coupled to the base of switching transistor Q51 and to the switch input. The collector of switching transistor Q54 is resistively coupled to the B+ voltage supply by resistor R38 and provides an input to the deceleration current generator 14.

The clamp circuit 18 comprises clamping transistors Q44, Q45 and Q46 coupled to the differential amplifier 10. The emitter of clamp transistor Q46 is connected to the emitters of differential transistors Q47 and Q50, while the collector of Q46 is commonly connected with a collector of the active load transistor Q49 and with the base of clamp transistor Q44, the base of transistor Q46 is adaptive to receive a bias signal having amplitude preferably representative of a vehicle wheel speed below which speed signal G is desired to be decoupled from the differentiator circuit. Clamp transistor Q44 has a collector coupled to circuit ground and has an emitter coupled to the common connection of the base and collector of clamp transistor Q45, which has an emitter coupled to the base of active load transistor Q49. The base of clamp transistor Q45 is resistively coupled by resistor R32 to the B+ voltage supply. For applications wherein signal G is unclamped and the differential pair Q47 and Q50 are desired to be selectively decoupled from input signal G, a bias signal G' on the base of clamping transistor Q46 effectively overrides signal B to inactivate the differentiating function of the accel-decel differentiating circuit.

The acceleration current generator 12 comprises acceleration current source transistor Q55 having an emitter resistively coupled to the B+ source, having a base coupled to the collector of switching transistor Q51, which provides the input signal C from switch 10. One collector of a plurality is coupled to the integrator circuit 16 to supply signal E in FIG. 2. Furthermore, current source transistor Q55 has a collector to provide output signal J exhibiting a current waveform representative of vehicle wheel acceleration. Likewise, signal P derived from another collector of current source transistor Q55 is representative of vehicle wheel acceleration.

Deceleration generator 14 comprises current source transistors Q56, Q57 and Q59. Transistors Q56 and Q57 have commonly connected emitters which are connected to circuit ground. The bases of source transistors Q56 and Q57 are commonly connected and are coupled to the collector of source transistor Q57 and to a collector of source transistor Q59. The collector of source transistor Q56 is coupled to provide output signal F to the integrator circuit 16, to the bases of switching transistors Q52 and Q54 and to a collector of the accel source transistor Q55. Source transistor Q59 has a base coupled to the collector of switching transistor Q54 to receive input signal D from switch 10 and has an emitter connected to the B+ voltage supply. Transistor Q59 supplies differentiator signal O at one of its collectors which exhibits a current waveform indicative of vehicle wheel deceleration.

The integrator circuit means 16 comprises integrating capacitor C1 and resistor R58 in series which couple the base of switching transistor Q52 to circuit ground. The integrating circuit means 16 supplies signal A by integrating the current waveforms E and F supplied by the acceleration generator 12 and deceleration generator 14 respectively.

The dual voltage comparator 20 of the variable threshold gate circuit 6 comprises comparator input transistors Q75 and Q89 and reference transistor Q76 having commonly connected emitters coupled to the collector of biasing current source transistor Q78. The base of bias transistor Q78 is commonly connected to the base and collector of bias transistor Q77 and is adaptive to receive a constant D.C. bias current $B_2$. Such a bias current is typically from a master biasing circuit in the skid control module but is also suitably provided by a conventional resistor biasing design technique. The emitter of Q77 and Q78 are commonly coupled to circuit ground. The base of comparator input transistor Q75 receives acceleration differentiator signal P and the base of comparator input transistor Q89 receives deceleration differentiator signal O. The base of reference transistor Q76 is coupled to the hysteresis circuit 28, to the variable reference generator 22, and to the storage circuit 23 therein. The collectors of input and reference transistors Q75, Q89 and Q76 are coupled to active load transistor Q74 which supplies proper bias currents thereto. Bias transistor Q73 has an emitter coupled to the base of active load transistor Q74 and has a base commonly connected to one of the collectors of load transistor Q74 and to the collector of reference transistor Q76. The collector of bias transistor Q73 is coupled to circuit ground.

The variable threshold gate circuit 6 further comprises variable reference generator 22 having accel pull-up transistor Q80, decel pull-up transistor Q83, pull-down transistors Q81 and Q82, and clamp transistor Q84, which determines when Q81 and Q82 should stop pulling down. That is, transistors Q80 and Q83 are responsive to input acceleration and deceleration inputs to increase the level of the variable reference voltage. Q81 and Q82 are responsive to decreasing acceleration and deceleration input signals to decrease the level of the variable reference voltage. Clamp transistor Q84 sets a minimum threshold level below which the variable reference voltage is not responsive to the acceleration and deceleration input signals. The multiple emitters of pull-up transistors Q80 and Q83 are respectively connected in common and coupled to the emitters of pull-down transistors Q81 and Q82, respectively. Pull-up transistor Q80 has a base coupled as an input to acceleration differentiator signal P and has a collector commonly connected to the collector of deceleration pull-up transistor Q83 and to the B+ supply. The base of pull-up transistor Q83 is coupled as an input to deceleration differentiator signal O. Clamp transistor Q84 has a base resistively coupled through resistor R50 to the B+ power supply and to circuit ground through resistors R52 and R53. The collector of clamp transistor Q84 is connected to the B+ power supply, and the emitter of clamp transistor Q84 is connected to the common bases of pull-down transistors Q81 and Q82. Transistor Q82 has a collector commonly connected to its base and has an emitter coupled to circuit ground through resistor R51. Pull-down transistor Q81 has a collector to circuit ground and has an emitter coupled through resistor R48 to the hysteresis circuit 28, to the base of reference transistor Q76 of the comparator circuit 20 and to the storage circuit 23.

The storage circuit means 23 comprises storage capacitor C2 coupling the base of reference transistor Q76 of the comparator circuit 20 to circuit ground. The storage capacitor C2 in conjunction with the signals supplied from the emitters of pull-up transistors Q80 and Q83 and pull-down transistors Q81 and Q82 provide a variable reference voltage signal H to the dual voltage comparator 20.

The acceleration gate output circuit 26 comprises current limiting transistor Q86, switching transistor Q85, and inverting transistor Q90. The base of switching transistor Q85 is connected to the collector of acceleration input comparator transistor Q75 which provides the acceleration gate input signal, and the emitter of switching transistor Q85 is connected to the base of the current limiting transistor Q86 which is further resistively coupled to the B+ voltage source through R55. The collectors of switching transistor Q85 provide a gated acceleration output signal $\overline{Q}$ and an input to the inverter transistor Q90 which provides output signal Q indicative of acceleration rates of the vehicle's wheels above the threshold level. Another collector of switching transistor Q85 is coupled to the input of the hysteresis circuit 28. Inverter transistor Q90 has a base resistively coupled to circuit ground and connected to switching transistor Q85 and provides output signal Q at its collector.

Deceleration gate output circuit 24 comprises switching transistor Q87 and inverting transistor Q88 and utilizes a collector of current limiting transistor Q86. The emitter of switching transistor Q87 is connected to the base of current limiting transistor Q86. The collectors of switching transistor Q87 provide an output signal $\overline{K}$ indicative of vehicle wheel deceleration rate above the threshold level and provides an input to the base of inverting transistor Q88 which provides gated deceleration output signal K also indicative of a wheel deceleration rate above the threshold. The base of switching transistor Q87 is coupled to the collector of deceleration input comparator transistor Q89 of the dual voltage comparator and switch circuit 20 which provides the deceleration gate input signal.

The hysteresis circuit 28 comprises hysteresis transistor Q79 having a collector resistively coupled to the variable reference voltage generator. The base of hysteresis transistor Q79 is resistively coupled to circuit ground while the emitter of Q79 is connected to circuit ground. The hysteresis transistor Q79 is selectively actuated by output circuits 24 and 26 to provide a discharge path to storage capacitor $C_2$ and accordingly lowers the signal H to provide a lowered initial threshold voltage level as determined by hysteresis transistor Q79 and resistor R49.

DETAILED DESCRIPTION — FIG. 4

Figure 4:
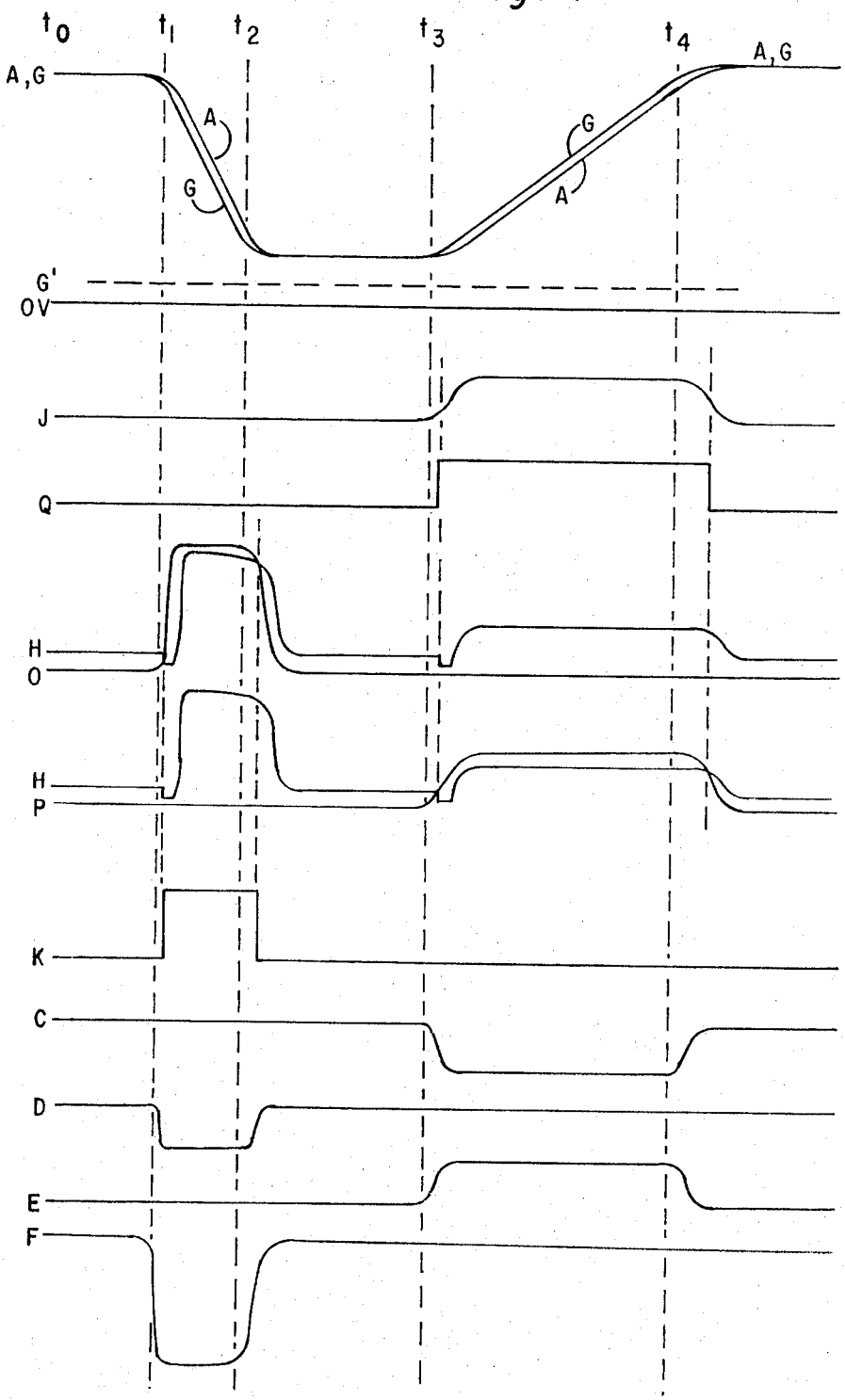
FIG. 4 graphically represents exemplary input and output waveforms illustrating a preferred mode of operation of the circuit depicted in FIGS. 3a–'3b.

A preferred mode of operation of this invention as embodied by the functional system of FIG. 2 and the specific implementation thereof in FIGS. 3a and 3b is best understood when viewing the exemplary input and output waveforms shown in FIG. 4.

At time TO the braking system of the land vehicle is inactivated, and wheel velocity is at a relatively high rate, as indicated by the amplitude of wheel speed signal G. The various states at time T0 of the other signals is in the steady state, inactivated condition. During dynamic interval T1–T2 the vehicle's brakes are applied, the wheel speed begins to decrease at a rate of deceleration which is shown in FIG. 4 to be relatively constant. Signal G decreases in amplitude with a slope representing the instantaneous wheel deceleration rate and the slope is shown to approach a constant for simplification of description.

FIGS. 2 and 3a depict the accel-decel differentiator circuit 4 acting in a voltage follower type mode for transmitting signal G through the differential amplifier and feedback loop to provide signal A substantially equal to signal G. Voltage A on the base of emitter-follower transistor Q52 is shown greater in magnitude than the instantaneous signal G for a particular wheel deceleration time between times T1 and T2. The differential of signal G and A is transmitted to the collector of transistor Q50 to provide signal G1 to the switch 10. The differential amplitude represented by G1 is coupled through Q54 providing signal D to source transistor Q59 of the deceleration generator 14. Source transistor Q56 is thereby programmed to a conductive state dependent on the magnitude of signal D to accordingly lower the voltage of signal A on the base of emitter-follower transistor Q52. Integrating circuit means 16 supplies that amount of current to the deceleration generator 14 necessary to provide signal A substantially equal to input signal G.

The currents O and F supplied by deceleration generator 14 are shown having a particular magnitude indicative of the deceleration rate between times T1 and T2. Integrator circuit means 16 provides the voltage signal A by integrating current signal F. This feedback process continues until the amplitude of speed dependent signal G ceases to decrease, or conversely until a voltage level G' is reached supplied by the clamp circuit 18. It is understood that FIG. 4 depicts an unclamped signal G with a bias voltage of G' as shown which is the level above which signal G1 on the collector of differential transistor Q50 is unclamped. The output signal O is shown as an analog representation of vehicle deceleration rate as provided by source transistor Q59 to the variable threshold gate circuit.

As noted above, the incremental signal D from the differential amplifier and switch 10 programs the deceleration generator 14 during time periods of decreasing magnitude of input signal G to provide signal F of sufficient magnitude such that integrator 16 provides feedback input signal A to the differential amplifier and switch 10 having substantially the same magnitude as input signal G. The necessary current supplied by the generator 14 is signal F and signal O therefore represents the time derivative of the input signal G. Such operation is best understood when viewing the well-known equation for a changing voltage V across a capacitor of capacitance C.

$$V = (1/C) \int i\, dt$$

EQN 1

That is, as the voltage on the capacitor is forced by the feedback loop to change to maintain signal A equal to G, and $i$ of Equation 1 is signal F from the deceleration generator, it mathematically follows from $$V_A = V_G = (1/C) \int i_F dt$$

EQN 2 that $$i_F = C(dV_A/dt)$$

EQN 3 and therefore signal current F represents the derivative or rate of change of input signal G.

After generation of the differentiator signals, the dual voltage comparator 20 and variable reference generator 22 receive the deceleration analog signal O and the variable reference generator 22 and the storage circuit 23 thereof provide reference signal H.

It is seen that gate circuit 6 is dynamically responsive to the pulses of signal O responsive to the deceleration period $t1$–$t2$. The pulse representing deceleration rate actuates decel pull-up transistor Q83, and thereafter pull-down and clamp transistors Q81 and Q84 respectively. The threshold signal H is supplied by storage capacitor C2, hysteresis circuit 28, and Q81 in combination. the comparator circuit 20 compares signal O to signal H which is selectively proportional to signal O and whenever signal O exceeds reference signal H, deceleration output signals M and K are generated. it is noted in the waveforms that the variable reference generator 22 provides the reference signal H responsive to the magnitude of O such that the second crossing of signal O and reference H is at a higher voltage level than the initial crossing, and signal H thereupon provides the variable threshold level featured in this invention. The deceleration gate output circuit 24 provides gated output signals K and $\overline{K}$ and feedback signal K1 indicative of a vehicle wheel deceleration rate above the variable threshold level. Signal K1 is coupled to hysteresis transistor Q79 for actuation thereof to provide hysteresis, i.e., a selective decreasing of reference signal H to thereby provide a lower threshold level at the time of the first crossing of signals O and H.

At time T2, wheel deceleration decreases toward zero and feedback signal A approaches input signal G in amplitude, and all signals representative of the differential therebetween approach a constant, substantially zero magnitude.

During interval $t3$ to $t4$ the wheels of the vehicle are accelerating, and the differentiator and gate circuits are dynamically responsive thereto. Signal G is shown to approach a constant rate of amplitude increase and to exhibit an amplitude directly related to vehicle wheel speed. Since signal G exceeds level G', the differential amplifier and switch 10 provide signal C to the acceleration generator 12 responsive to the differential between signals G and A. Circuit functioning is analogous to that described for deceleration interval $T_1$–$T_2$ except switching transistor Q51 provides signal C in response to differential signal G1. Source transistor Q85 provides signals E, P and J having amplitudes indicative of the instantaneous wheel acceleration rate. As is well-known in the art, collectors of multiple collector p-n-p transistors can provide selective ratios of currents and accordingly signals E, P and J are related by selected ratios, each representing the acceleration rate. Acceleration signal E is coupled to the integrator circuit means 16, and charges integrator capacitor C1 to increase voltage A impressed on the base of emitter-follower transistor Q52. This feedback and incrementing process continues until time T4 wherein signal G approaches a constant magnitude representing a zero rate of velocity change of the vehicle's wheels.

After generation of the differentiator signals, the dual voltage comparator 20 and variable reference generator 22 receive the acceleration analog signal P, and the variable reference generator 22 and the storage circuit 23 thereof provide reference signal H. It is is seen that gate circuit 6 is dynamically responsive to the pulses of signal P responsive to the acceleration period $t3-t4$. The pulse representing acceleration rate actuates accel pull-up transistor Q83, and thereafter pull-down and clamp transistors Q81 and Q84 respectively. The threshold signal H is supplied by storage capacitor $C_2$, hysteresis circuit 28, and Q81 in combination. The comparator circuit 20 compares signal P to signal H which is selectively proportional to signal P, and whenever signal P exceeds reference signal H, acceleration output signals N and Q are generated. It is noted in the waveforms that the variable reference generator 22 provides the reference signal H responsive to the magnitude of P such that the second crossing of signal P and reference H is at a higher voltage level than the initial crossing, and signal H thereupon provides the variable threshold level featured in this invention. The acceleration gate output circuit 26 provides gated output signals Q and $\overline{Q}$ and feedback signal Q1 indicative of a vehicle wheel acceleration rate above the variable threshold level. Signal Q1 is coupled to hysteresis transistor Q79 for actuation thereof to provide hysteresis, i.e., a selective decreasing of reference signal H to thereby provide a lower threshold level at the time of the first crossing of signals P and H.

At time T4, wheel acceleration decreases toward zero and feedback signal A approaches input signal G in amplitude, and all signals representative of the differential therebetween approach a constant, substantially zero magnitude.

The preferred embodiment of this invention depicted in FIGS. 3a and 3b is advantageously utilized in a monolithic integrated circuit. Utilization of multiple collector p-n-p transistors provides several features which are most advantageous in integrated circuit design. For example, utilization of multi-collector p-n-p transistors allows circuit biasing without convention resistor biasing networks with its accompanying low packing density characteristic due to the relatively large substrate area occupied in forming diffused resistors. Secondly, multi-collector transistors allow for providing a plurality of output signals which not only are respectively isolated from one another, but also may be provided in a preferred magnitude ratio with each other. Also, the multi-collector transistors utilized as active loads for amplifiers provide unusually high gain for a single stage amplifier, thereby eliminating the necessity for extra amplifier stages to provide high and accordingly decreased circuit size, and a cheaper circuit to build. Furthermore, the multi-collector transistors provide equal currents in comparator transistors to minimize any VRE errors at the trip point of the comparator It will be apparent from the foregoing disclosure that the invention herein described advantageously is utilized in a vehicle skid control module for providing analog and gated signals representative of rates of acceleration and deceleration of the vehicle's wheels. However, it is understood that the differentiator and threshold circuits of this invention need not be limited to application in a vehicle skid control braking system. For example, the differentiator and gate circuits herein disclosed could advantageously be utilized in analog computer applications.

It is understood that various circuit modifications to the preferred embodiment of this invention herein disclosed, and utilizations thereof in other than skid control systems will be apparent to those skilled in the art without departing from the scope of the invention.

What is claimed is:

1. In a vehicle skid control braking system of the type which monitors land wheel speed to provide an input to the skid control system and which generates in response thereto output signals representative of other vehicle conditions for selectively interrupting application of the brake system of the vehicle, a differentiator and threshold circuit providing output signals representing acceleration and deceleration conditions of the vehicle wheels above a variable threshold level, comprising in combination:

differentiator circuit means responsive to a first input signal representative of vehicle wheel speed for providing a first differentiator signal representative of wheel acceleration conditions, a second differentiator signal representative of wheel deceleration conditions, and a third differentiator signal representative of wheel acceleration conditions, said differentiator circuit means comprising:

differential amplifier and switch means responsive to said first input signal and to a feedback input signal having a magnitude representative of a rate of vehicle wheel speed incrementally approaching that rate represented by said first input signal, for providing an acceleration differential signal and a deceleration differential signal, an acceleration current generator responsive to said acceleration differential signal for providing said first and third differentiator signals representative of vehicle wheel acceleration rates, a deceleration current generator responsive to said deceleration differential signal for providing said second differentiator signal representative of vehicle wheel deceleration rates, and an integrating circuit means responsive to said acceleration and deceleration current generators for selectively providing the mathematical integral of said acceleration and deceleration differentiator signals to thereby provide said feedback input signal; and a threshold gate circuit means having a single variable threshold level and responsive to said differentiator signals for selectively providing first and second output signals when said differentiator signals exceed a variable threshold level, said output signals generated at a wheel acceleration and deceleration rate lower than that rate whereat they are deactivated.

2. The system of claim 1 wherein said differentiator circuit means further includes a clamp circuit for selectively biasing said differential amplifier and switch means into a condition non-responsive to said first input signal.

3. The system of claim 2 wherein said non-responsive condition is provided when vehicle wheel speed decreases below a preselected rate.

4. The system of claim 1 wherein said variable threshold gate circuit means comprises;
 a. a voltage comparator and switching circuit responsive to said first and second differentiator signals for providing first and second gated output signals when said first and second differentiator signals exceed said variable threshold level;
 b. a variable reference generator having an output means responsive to said first and second differentiator signals, for providing a reference signal to said voltage comparator and switching circuit; said gated output signals generated when said differentiator signals exceed said reference signal in magnitude; and
 c. a storage capacitor coupled to said reference generator for storing said reference signal.

5. The system of claim 4 wherein said variable threshold gate circuit means further includes:
 a. a deceleration output circuit responsive to said voltage comparator and switching circuit for providing said first output signal;
 b. an acceleration output circuit responsive to said voltage comparator and switching circuit for providing said output signal.

6. The system of claim 5 wherein said variable threshold gate circuit means further includes a hysteresis circuit responsive to said acceleration and deceleration output circuits for selectively biasing said variable reference generator to bias said reference signal and thereby decrease said variable threshold level.

7. The system of claim 6 wherein said integrating circuit means comprises a capacitor coupling said current generators and said differential amplifier and switch means to circuit ground.

8. The system of claim 7 wherein said variable reference generator comprises a pair of differential transistors having commonly connected emitters, one of which emitters is capacitively coupled to circuit ground.

* * * * *